US009124738B2

(12) United States Patent
Matsumoto

(10) Patent No.: US 9,124,738 B2
(45) Date of Patent: Sep. 1, 2015

(54) NETWORK SYSTEM, ANALYSIS SYSTEM AND CONTROL METHOD THEREFOR

(71) Applicant: CANON KABUSHIKI KAISHA, Tokyo (JP)

(72) Inventor: Tetsuya Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 13/673,830

(22) Filed: Nov. 9, 2012

(65) Prior Publication Data

US 2013/0124881 A1 May 16, 2013

(30) Foreign Application Priority Data

Nov. 14, 2011 (JP) ................................. 2011-248819
Oct. 4, 2012 (JP) ................................. 2012-221970

(51) Int. Cl.

*H04N 1/00* (2006.01)
*G06F 11/30* (2006.01)
*G06F 11/34* (2006.01)
*G06F 11/32* (2006.01)

(52) U.S. Cl.

CPC ........ *H04N 1/00344* (2013.01); *G06F 11/3013* (2013.01); *G06F 11/3062* (2013.01); *G06F 11/3409* (2013.01); *G06F 11/3476* (2013.01); *H04N 1/00832* (2013.01); *H04N 1/00885* (2013.01); *G06F 11/32* (2013.01); *G06F 11/3419* (2013.01); *H04N 2201/0082* (2013.01); *H04N 2201/0094* (2013.01); *Y02B 60/165* (2013.01)

(58) Field of Classification Search

CPC ............... G06F 1/00; G06F 1/04; G06F 1/12; G06F 1/26; G06F 1/32; G06F 11/30; G06F 15/16
USPC .................................. 713/323, 300, 310, 340
See application file for complete search history.

(56) References Cited

U.S. PATENT DOCUMENTS

| | | | | |
|---|---|---|---|---|
| 8,316,254 | B2 * | 11/2012 | Kaneko et al. | 713/323 |
| 8,330,434 | B2 * | 12/2012 | Melanson | 323/207 |
| 2010/0070216 | A1 * | 3/2010 | Murata | 702/61 |
| 2011/0058822 | A1 * | 3/2011 | Shioyasu et al. | 399/8 |
| 2012/0059606 | A1 * | 3/2012 | Ikari | 702/61 |

FOREIGN PATENT DOCUMENTS

| | | | |
|---|---|---|---|
| CN | 101771783 | A | 7/2010 |
| CN | 102014226 | A | 4/2011 |
| CN | 102193538 | A | 9/2011 |
| CN | 102195834 | A | 9/2011 |
| JP | 2003-335026 | A | 11/2003 |

* cited by examiner

*Primary Examiner* — Thomas Lee
*Assistant Examiner* — Mohammad A Rahman
(74) *Attorney, Agent, or Firm* — Canon U.S.A., Inc. IP Division

(57) ABSTRACT

An analysis system according to the present invention has a configuration for obtaining power consumption of an image forming apparatus in which a power log has been collected, and controlling a display of the power consumption. In a case where if the image forming apparatus is in a predetermined state, and power consumption of the image forming apparatus in the predetermined state has not been recorded in a log, then the analysis is performed and power consumption in the predetermined state is obtained by using time spent in the predetermined state and power consumption per unit time of the image forming apparatus in the predetermined state.

21 Claims, 16 Drawing Sheets

FIG.7A

| DEVICE ID (701) | DEVICE NAME (702) | MODEL (703) | POWER LOG COLLECTION (704) | INTEGRAL POWER ACQUISITION (705) | OPTION DEVICE INFORMATION (706) | OPTION DEVICE POWER SOURCE (707) |
|---|---|---|---|---|---|---|
| 101 | MFP 001 | Model 100 | POSSIBLE | POSSIBLE | Option 001 | MAIN BODY |
| 102 | MFP 002 | Model 100 | POSSIBLE | POSSIBLE | NONE | — |
| 103 | MFP 003 | Model 200 | POSSIBLE | IMPOSSIBLE | Option 002 | SEPARATE POWER SOURCE |
| 104 | MFP 004 | Model 600 | IMPOSSIBLE | POSSIBLE | NONE | MAIN BODY |
| 105 | MFP 005 | Model 50 | IMPOSSIBLE | IMPOSSIBLE | NONE | — |

FIG.7B

| DEVICE ID (708) | STANDBY MODE POWER CONSUMPTION (W) (709) | POWER CONSUMPTION DURING JOB PROCESSING (W) (710) | POWER-SAVING MODE POWER CONSUMPTION (W) (711) | POWER-OFF POWER CONSUMPTION (W) (712) |
|---|---|---|---|---|
| 101 | — | — | 1 | 0.01 |
| 102 | — | — | 1 | 0.01 |
| 103 | — | — | 3 | 0.02 |
| 104 | 120 | 600 | 2 | 0.01 |
| 105 | 100 | 530 | 1 | 0.01 |

FIG.7C

| DEVICE ID (713) | STANDBY MODE POWER CONSUMPTION (W) (714) | POWER CONSUMPTION DURING JOB PROCESSING (W) (715) | POWER-SAVING MODE POWER CONSUMPTION (W) (716) | POWER-OFF POWER CONSUMPTION (W) (717) |
|---|---|---|---|---|
| 101 | — | — | 1 | 0.01 |
| 103 | 30 | 90 | 1 | 0.01 |

FIG.8

| DEVICE ID (801) | DATE-TIME (802) | PRE-TRANSITION-STATE (803) | POST-TRANSITION-STATE (804) | POWER CONSUMPTION (Wh) (805) |
|---|---|---|---|---|
| 101 | 2011/9/26 10:55 | STANDBY MODE | POWER-SAVING MODE | 80.5 |
| 101 | 2011/9/26 11:02 | POWER-SAVING MODE | STANDBY MODE | — |
| 101 | 2011/9/26 11:03 | STANDBY MODE | JOB IS BEING PROCESSED | 2.45 |
| 101 | 2011/9/26 11:12 | JOB IS BEING PROCESSED | STANDBY MODE | 157.3401 |
| 101 | 2011/9/26 11:42 | STANDBY MODE | STANDBY MODE | 121.3578 |
| 101 | 2011/9/26 12:00 | STANDBY MODE | POWER-SAVING MODE | 132.5432 |
| 101 | 2011/9/26 12:30 | POWER-SAVING MODE | POWER-OFF | — |
| 101 | 2011/9/26 13:12 | POWER-OFF | STANDBY MODE | — |

| DEVICE ID | DATE-TIME | INTEGRAL POWER (Wh) |
|---|---|---|
| 104 | 2011/9/26 09:00:00 | 10100 |
| 104 | 2011/9/26 09:10:00 | 10120 |
| 104 | 2011/9/26 09:20:00 | 10315 |
| 104 | 2011/9/26 09:30:00 | 10342 |
| 104 | 2011/9/26 09:40:00 | 10533 |
| 104 | 2011/9/26 09:50:00 | 10559 |
| 104 | 2011/9/26 10:00:00 | 10610 |
| 104 | 2011/9/26 10:10:00 | 10681 |

| DEVICE ID | DATE-TIME | TRANSITION STATE |
|---|---|---|
| 104 | 2011/9/26 09:00:02 | STANDBY MODE |
| 104 | 2011/9/26 09:01:00 | JOB IS BEING PROCESSED |
| 104 | 2011/9/26 09:01:20 | STANDBY MODE |
| 104 | 2011/9/26 09:20:05 | POWER-SAVING MODE |
| 104 | 2011/9/26 09:25:12 | STANDBY MODE |
| .... | .... | .... |
| 105 | 2011/9/26 09:00:01 | STANDBY MODE |
| 105 | 2011/9/26 09:10:05 | JOB IS BEING PROCESSED |
| 105 | 2011/9/26 09:10:30 | STANDBY MODE |
| 105 | 2011/9/26 09:20:51 | POWER-SAVING MODE |
| 105 | 2011/9/26 09:40:32 | POWER-OFF |

FIG.14

| 1401 COUNTING MONTH | 1402 DEVICE ID | 1403 TOTAL POWER CONSUMPTION (Wh) | 1404 STANDBY MODE POWER CONSUMPTION (Wh) | 1405 POWER CONSUMPTION DURING JOB PROCESSING (Wh) | 1406 POWER-SAVING MODE POWER CONSUMPTION (Wh) | 1407 POWER-OFF POWER CONSUMPTION (Wh) |
|---|---|---|---|---|---|---|
| 2011/9 | 101 | 35842 | 13020 | 20320 | 2469 | 33 |
| 2011/9 | 102 | 65538 | 23249 | 40341 | 1893 | 55 |
| 2011/9 | 103 | 86371 | 19987 | 65071 | 1281 | 32 |
| 2011/9 | 104 | 72491 | — | — | 1503 | 28 |
| 2011/9 | 105 | 61407 | 16987 | 43071 | 1290 | 59 |

| DEVICE NAME | TOTAL POWER CONSUMPTION (Wh) | POWER METER |
|---|---|---|
| MFP 001 | 35842 | MOUNTED |
| MFP 002 | 65538 | MOUNTED |
| MFP 003 | 86371 | MOUNTED |
| MFP 004 | 72491 | MOUNTED |
| MFP 005 | 61407 | NOT-MOUNTED |

| DEVICE NAME | STANDBY MODE POWER CONSUMPTION (Wh) | POWER CONSUMPTION DURING JOB PROCESSING (Wh) | POWER-SAVING MODE POWER CONSUMPTION (Wh) | POWER-OFF POWER CONSUMPTION (Wh) | POWER METER |
|---|---|---|---|---|---|
| MFP 001 | 13020 | 20320 | 2469 | 33 | MOUNTED |
| MFP 002 | 23249 | 40341 | 1893 | 55 | MOUNTED |
| MFP 003 | 19987 | 65071 | 1281 | 32 | MOUNTED |
| MFP 005 | 16987 | 43071 | 1290 | 59 | NOT-MOUNTED |

NETWORK SYSTEM, ANALYSIS SYSTEM AND CONTROL METHOD THEREFOR

BACKGROUND OF THE INVENTION

1. Field of the Invention

The present invention relates to a technique for obtaining a power consumption amount using information obtained from an image forming apparatus.

2. Description of the Related Art

In recent years, in order to reduce an emission amount of greenhouse effect gases, such as carbon dioxide ($CO_2$), reducing the power consumption amount in the operation of a printer or a multifunction peripheral, or any other image forming apparatuses has been demanded. Therefore, it is important to enable a user to recognize (what is called "visualization") the power consumption amount in the operation of the image forming apparatus.

For example, in Japanese Patent Application Laid-Open No. 2003-335026, a technique for measuring an integral power and an accumulated time in each operation state, using a power meter mounted on the image forming apparatus, and printing them as a report is discussed. With the technique, it becomes possible to figure out the power consumption amount by mounting the power meter on the image forming apparatus.

In the apparatus discussed in the above-described Japanese Patent Application Laid-Open No. 2003-335026, the power consumption can be figured out based on information from the power meter. However, when the image forming apparatus goes into a power-off or a power-saving mode, the power meter may not be operated, and accordingly the power consumption may not be measured. Depending on the image forming apparatus, when going into the power-saving mode, control may be performed not to operate the power meter in order to save the power consumption. Further, depending on a method for power supply to an option device, the power consumption measured by the power meter may need to be corrected.

SUMMARY OF THE INVENTION

Therefore, the present invention is to provide a technique that enables appropriately obtaining a power consumption amount, in consideration of a power supply state in which a power meter mounted on an image forming apparatus is not operating, and a method for power supply to an option device.

A network system according to the present invention includes a plurality of image forming apparatuses, and an analysis system that manages image forming apparatuses, wherein the plurality of image forming apparatuses includes an apparatus that manages a first power log which contains information of power consumption for respective states of an apparatus using a power meter, and an apparatus that manages a second power log which contains information of integral power consumption after use of an apparatus using a power meter is started, and the analysis system includes a collection unit configured to collect the first and second power logs, a first analysis unit configured to obtain power consumption of an image forming apparatus in which the first power log has been collected, using the first power log, a second analysis unit configured to obtain power consumption of an image forming apparatus in which the second power log has been collected, using the second power log, and a display control unit configured to control a display of power consumption which has been obtained by the first and second analysis units. In a case where since the image forming apparatus managing the first power log was in a predetermined state, power consumption in the state has not been recorded, the first analysis unit obtains power consumption in the predetermined state, using time spent being in the predetermined state and power consumption per unit time of the image forming apparatus in the predetermined state. In a case where since the image forming apparatus managing the second power log was in a predetermined state, power consumption in the state has not been recorded, the second analysis unit obtains power consumption in the predetermined state, using time spent being in the predetermined state and power consumption per unit time of the image forming apparatus in the predetermined state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A, 7B, and 7C illustrate examples of tables provided in a device information management unit.

FIG. 8 illustrates an example of a table provided in a log collection unit.

FIG. 9 illustrates an example of a table provided in an integral power acquisition unit.

FIG. 10 illustrates an example of a table provided in a state monitoring unit.

FIG. 14 illustrates an example of a table provided in an analysis processing unit.

DESCRIPTION OF THE EMBODIMENTS

Various exemplary embodiments, features, and aspects of the invention will be described in detail below with reference to the drawings.

<Description of System Configuration>

Figure 1:
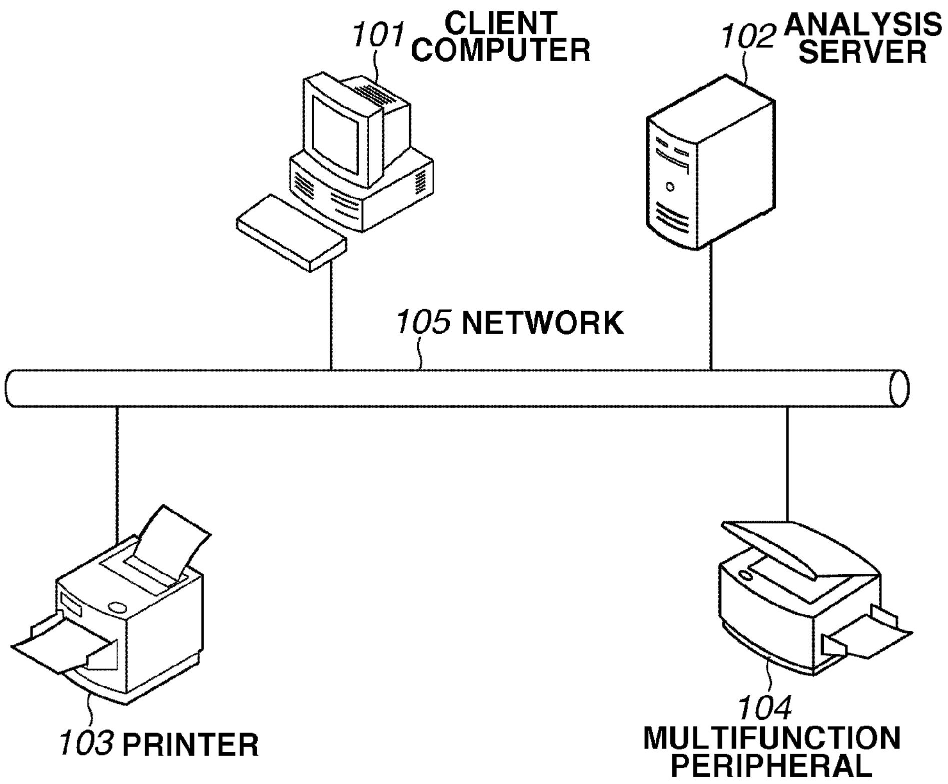
FIG. 1 is a schematic diagram illustrating a configuration of a network system according to an exemplary embodiment of the present invention.

FIG. 1 is a schematic diagram illustrating a configuration of a network system according to an exemplary embodiment of the present invention.

In FIG. 1, there is illustrated a client computer 101 that enables a user to generate image data, and to perform printing.

The client computer 101 includes hardware resources described below, and software resources including an operating system (OS), a printer driver, and the like. Furthermore, the client computer 101 is connected to an image forming apparatus to communicate with the image forming apparatus in accordance with a predetermined protocol. The image forming apparatus is connected to a network 105.

A printer 103 receives print data via a network, and performs printing on an actual sheet using a conventionally known printing technique, such as an electrophotographic technique or an inkjet technique. A multifunction peripheral (MFP) 104 receives print data via the network, and performs printing on an actual sheet, using the conventionally known printing technique, such as the electrophotographic technique or the inkjet technique. Further, the multifunction peripheral 104 has the functions of reading out a paper original document via a scanner, performing a copying operation, and transmitting an e-mail including converted image data. As a matter of course, a printer that does not have any copying function is also employable. In the present invention, the printer 103 or the multifunction peripheral 104 is collectively referred to as an image forming apparatus.

An analysis server 102 performs analysis of power consumptions on the printer 103 and the multifunction peripheral 104.

The client computer 101, the analysis server 102, the printer 103, and the multifunction peripheral 104 are connected each other to mutually communicate via the network 105 according to Ethernet (registered trademark) or any other conventionally known technique.

In the present invention, it is also possible to realize the analysis server 102 as an analysis system constituted by one or more apparatuses (analysis server and data base server, etc.). Further, the analysis server 102 is separately configured apart from the printer 103 and the multifunction peripheral 104, but the printer 103 and the multifunction peripheral 104 may be configured to include therein a module having similar functions. In this case, network communication to be performed between the analysis server 102 and the printer 103 and the multifunction peripheral 104 are replaced by data transmission/reception via an internal system bus.

<Internal Configuration of Computer>

Figure 2:
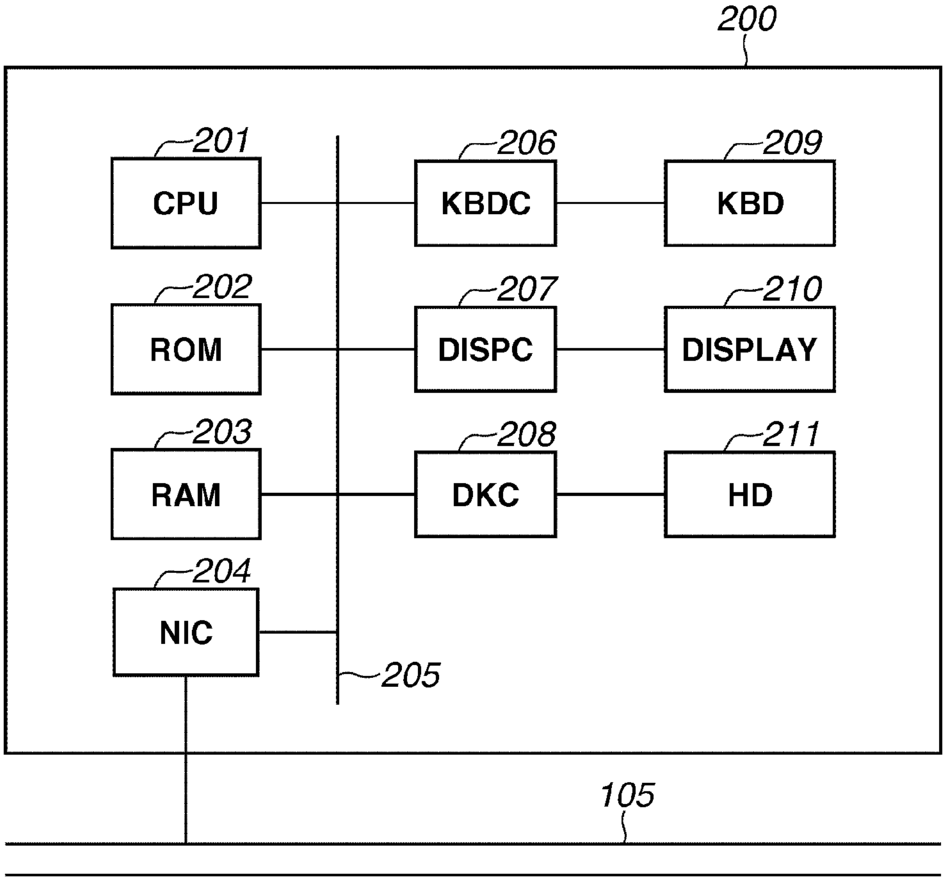
FIG. 2 is a block diagram illustrating an example of internal configuration of an information processing apparatus that constitutes a client computer, or an analysis server.

FIG. 2 is a block diagram illustrating an example of an internal configuration of an information processing apparatus that constitutes the client computer 101, and the analysis server 102.

In FIG. 2, a personal computer (PC) 200 is illustrated.

A personal computer (PC) 200 includes a central processing unit (CPU) 201 that executes software program stored in a read-only memory (ROM) 202 or a hard disk (HD) 211 (i.e., a large-scale storage device). The CPU 201 comprehensively controls each hardware connected to a system bus 205. A random-access memory (RAM) 203 acts as a main memory or a work area for the CPU 201. A network interface card (NIC) 204 performs bidirectional data transmission and reception with other node, via the network 105.

A key board controller (KBDC) 206 controls each instruction input from a key board (KBD) 209 provided for the PC 200. A display controller (DISPC) 207 controls a display of a display module (DISPLAY) 210 that may be, for example, constituted by a liquid crystal display. A disk controller (DKC) 208 controls the hard disk (HD) 211 which is amass-storage device.

<Internal Configuration of Multifunction Peripheral>

Figure 3:
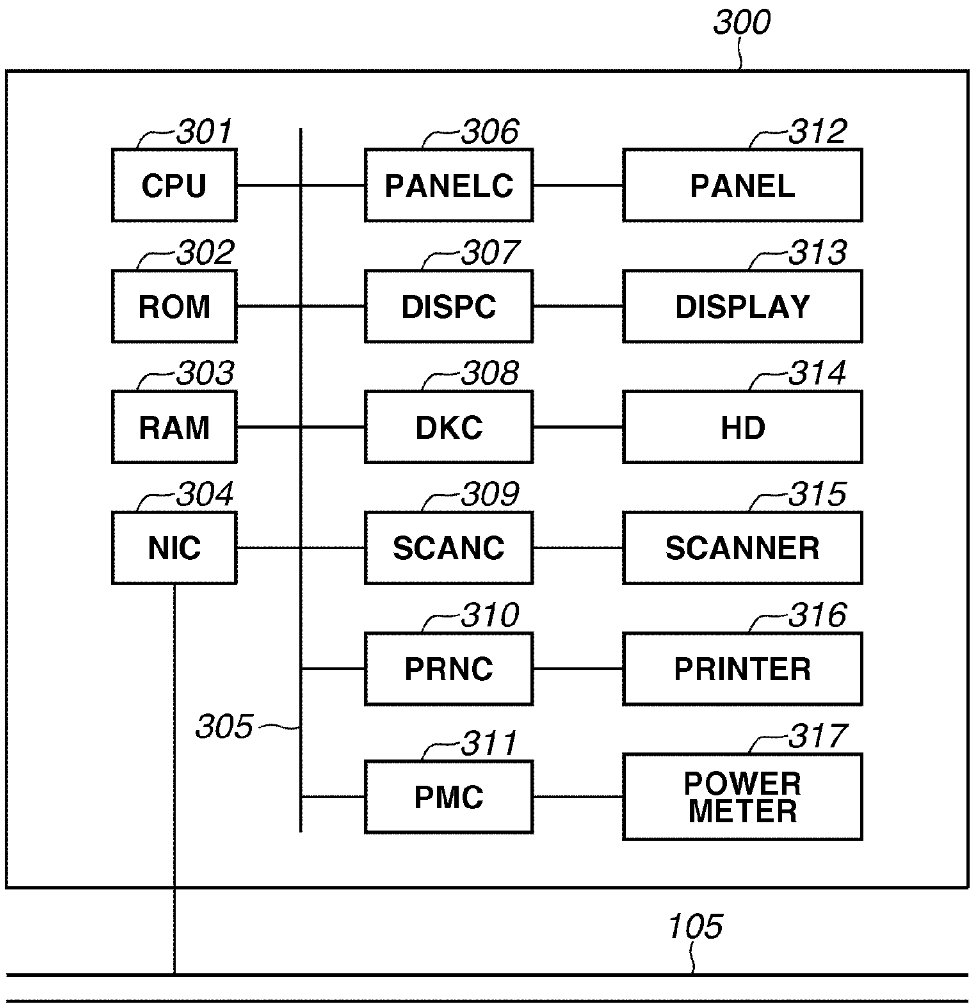
FIG. 3 is a block diagram illustrating an example of an internal configuration of a multifunction peripheral.

FIG. 3 is a block diagram illustrating an example of the internal configuration of the multifunction peripheral 104 illustrated in FIG. 1.

In FIG. 3, the entire multifunction peripheral 300 is illustrated. The multifunction peripheral 300 includes a CPU 301 that executes software program stored in a ROM 302 or a HD 314 as a large-scale storage device such as a hard disk. The CPU 301 comprehensively controls each hardware connected to a system bus 305. A RAM 303 acts as a main memory or a work area for the CPU 301. A network interface card (NIC) 304 performs data transmission and reception with other node, via a network 105.

A panel controller (PANELC) 306 controls each instruction input via an operation panel (PANEL) 312 provided in the multifunction peripheral. A display controller (DISPC) 307 controls a display of a display module (DISPLAY) 313 that may be, for example, constituted by a liquid crystal display. A disk controller (DKC) 308 controls the hard disk (HD) 314, serving as a mass-storage device. A scanner controller (SCANC) 309 controls an optical scanner device (scanner) 315 provided in the multifunction peripheral to read a paper document. A printer controller (PRNC) 310 controls a printer apparatus (printer) 316 provided in the multifunction peripheral to perform printing on an actual sheet using the conventionally known printing technique, such as the electrophotographic technique or the inkjet technique.

A power meter controller (PMC) 311 receives and controls a signal from a power meter 317 provided in the multifunction peripheral to perform power measurement.

The internal configuration of the printer 103 illustrated in FIG. 1 could be described as the one excluding the scanner controller 309 and the optical scanner device 315 from the internal configuration of the multifunction peripheral 104 described above. Furthermore, the internal configuration of the printer 103 may be a configuration excluding the panel controller (PANELC) 306, the operation panel 312, the display controller (DISPC) 307, the display module (DISPLAY) 313, the power meter controller (PMC) 311, and the power meter 317.

<Functional Configuration of Client Computer>

Figure 4:
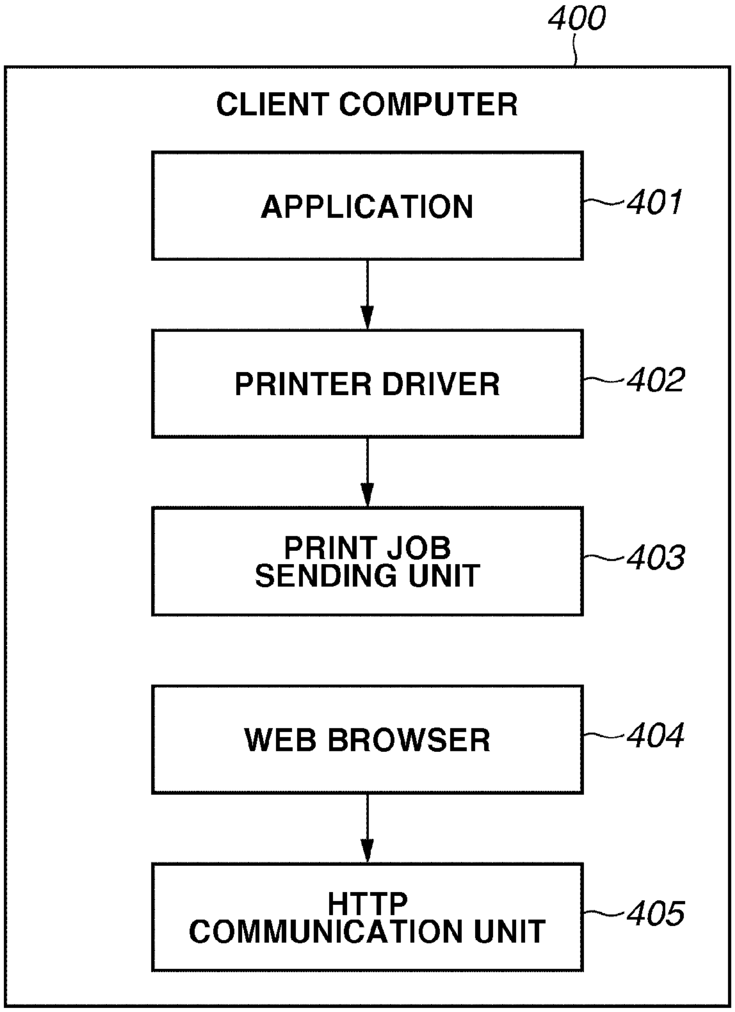
FIG. 4 is a block diagram illustrating an example of a functional configuration of a client computer.

FIG. 4 is a block diagram illustrating an example of the functional configuration of the client computer 101 illustrated in FIG. 1.

In FIG. 4, the entire client computer 400 is illustrated. A print application 401 performs print instruction by transmitting a rendering command to a printer driver 402. The printer driver 402 converts each rendering command received from the print application 401 into print data that may be interpreted by the multifunction peripheral, i.e., page description language (PDL). Furthermore, the printer driver 402 generates a print job, and transmits it to a print job transmission unit 403. The print job transmission unit 403 transmits the print job received from the printer driver 402 to the multifunction peripheral 104.

A web browser 404 interprets hypertext markup language (HTML) data, and causes the display module 210 to perform screen rendering. Further, the web browser 404 receives a user operation input via the key board and transmits a request to an HTTP communication unit 405. In response to the communication request from the web browser 404, the HTTP communication unit 405 communicates with the image processing apparatus via the NIC 204 using the HTTP or hypertext transfer protocol security (HTTPS) protocol to request a web page and receive web page data.

<Functional Configuration of Analysis Server>

Figure 5:
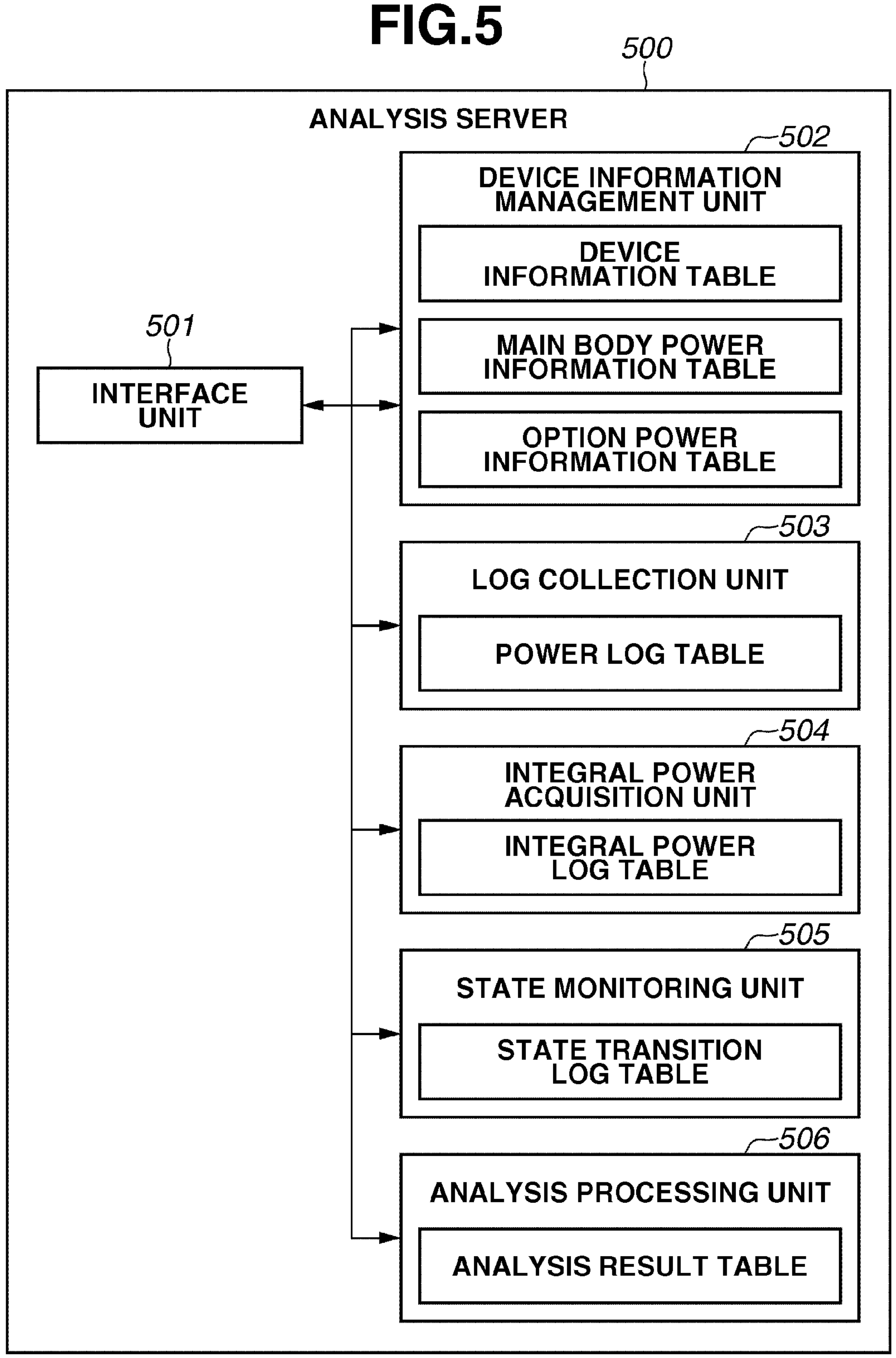
FIG. 5 is a block diagram illustrating an example of a functional configuration of an analysis server.

FIG. 5 is a block diagram illustrating an example of a functional configuration of the analysis server 102 illustrated in FIG. 1.

In FIG. 5, the entire analysis server 500 is illustrated. An interface unit 501 communicates with the client computer 101, the printer 103, and the multifunction peripheral 104, via the network 105 through the NIC 204 illustrated in FIG. 2.

A device information management unit 502 retains information concerning the image forming apparatus. The device information management unit 502 acquires information such as capability information or configuration information from the printer 103, or the multifunction peripheral 104, via the interface unit 501 and can also store the information.

A log collection unit 503 regularly collects via the interface unit 501 and stores, a power log managed by a log management unit 613 of the printer 103, or the multifunction peripheral 104. Further, when the printer 103 or the multifunction peripheral 104 transmits a power log, and the log collection unit 503 receives the power log, the log collection unit 503 may store the power log.

An integral power acquisition unit 504 regularly acquires via the interface unit 501, an integral electric power amount managed by a power management unit 612, as described below, of the printer 103, or the multifunction peripheral 104, and generates and stores an integral power log. Further, the integral power acquisition unit 504 may generate and store the integral power log, when the printer 103, or the multifunction peripheral 104 transmits an integral power amount, and the integral power acquisition unit 504 receives the integral power amount.

A state monitoring unit 505 receives power supply state notification from the printer 103, or the multifunction peripheral 104, via the interface unit 501, and generates and stores a state transition log.

An analysis processing unit 506 analyzes power consumption of an image forming apparatus such as the printer 103, or the multifunction peripheral 104, based on power log information, integral power log information, state transition log information, power consumption information of the image forming apparatus, and power consumption information of the option device.

<Functional Configuration of Multifunction Peripheral>

Figure 6:
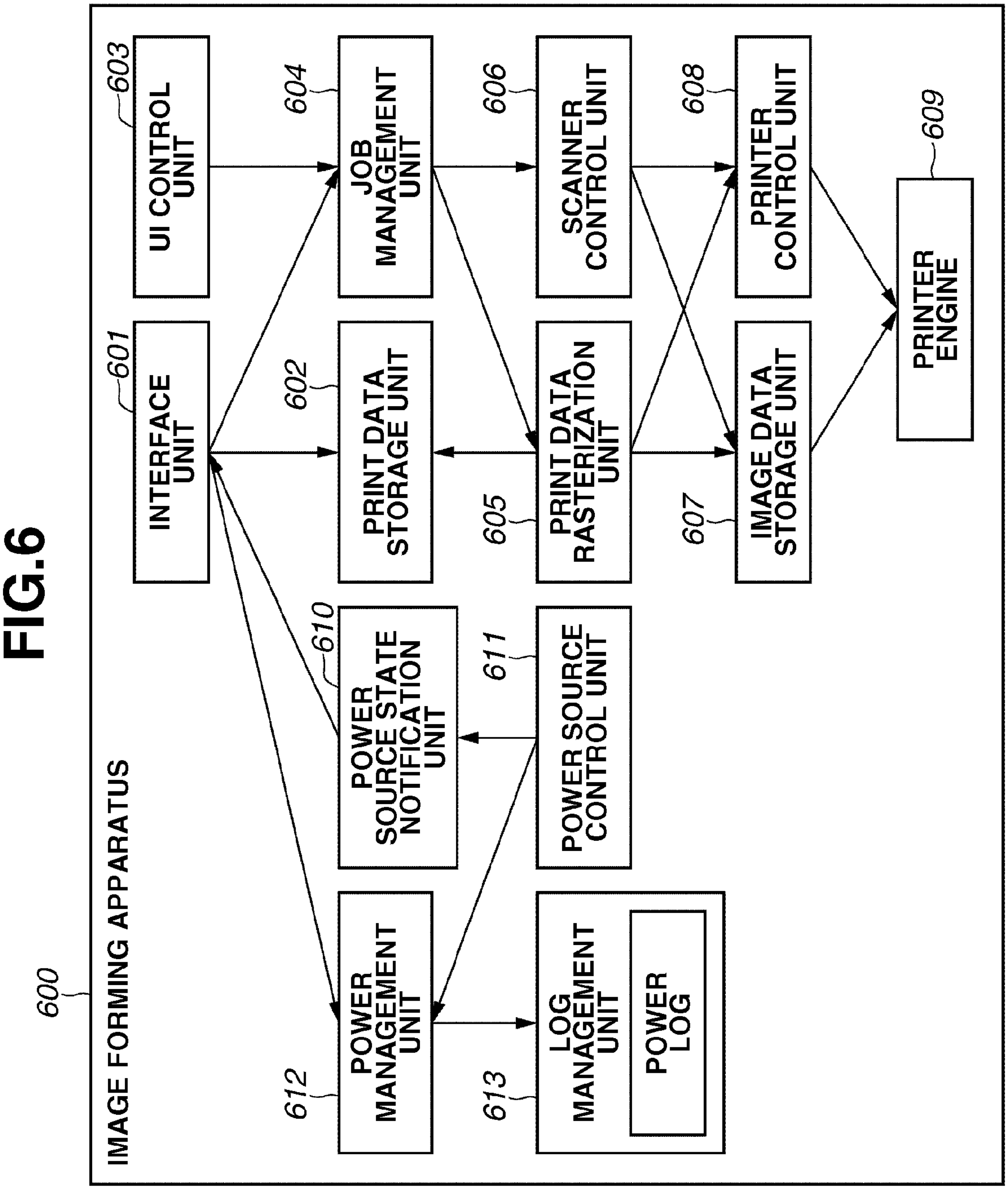
FIG. 6 is a block diagram illustrating an example of data processing configuration of the multifunction peripheral.

FIG. 6 is a block diagram illustrating an example of a data processing configuration of the multifunction peripheral 104 illustrated in FIG. 1. In FIG. 6, the entire multifunction peripheral 600 is illustrated. An interface unit 601 is connected to the network 105, and receives a print job from the client computer 101.

A print data storage unit 602 temporarily stores print job data. A user interface (UI) control unit 603 controls the operation panel 311 via the controller (PANELC) 306 to receive a copy instruction, or a scan and transmission instruction issued to the multifunction peripheral 104 from a user. A job management unit 604 analyzes print job received from the client computer 101, and acquires output attribute information, such as a user name and the number of copies of prints, and color print. The job management unit 604 manages the acquired output attribute information together with start date and time of the job as job information. A print data rasterization unit 605 acquires print data from the print data storage unit 602 according to the job information stored in the job management unit 604. The print data rasterization unit 605 performs image generation processing and generates image data on the RAM 303. A scanner control unit 606 controls the scanner controller 309 to scan a paper document and generate image data.

In a case where an automatic document feeder (ADF), or a reverse document feeder (RDF) or the like is connectable to the scanner control unit 606 as a document feeding device, the scanner control unit 606 controls a document feeding and a document discharge from the ADF or RDF. Further, when reading out two-sided documents, the scanner control unit 606 may perform reversing control of the documents. An image data storage unit 607 temporarily stores image data generated by the print data rasterization unit 605 and the scanner control unit 606. A printer control unit 608 controls a printer engine 609 to perform printing of image data stored in the image data storage unit 607. The printer engine 609 actually prints the image data stored in the image data storage unit 607 on a printing sheet or other recording medium using the conventionally known printing technique, such as the electrophotographic technique or the inkjet technique.

A power supply control unit 611 controls power supply of the multifunction peripheral 104, and manages power supply states, such as a standby mode, a power-saving mode, and a power-off. The power supply control unit 611 can shift to each power supply state, depending on various conditions. For example, the power supply control unit 611 shifts to the power-off or the power-saving mode, in a case where operation has not been performed on the multifunction peripheral 104 for a given time period, and a print job, FAX, or a command reception from a network have not been performed, in the standby mode.

Further, the power supply control unit 611 changes the power supply state in response to a power supply state change request, such as shifting to the power-off or the power-saving mode, from the analysis server 102. Furthermore, the power supply control unit 611 shifts to the power-off or the power-saving mode at a preset time of day. The power supply control unit 611, when changing a power supply state, notifies a power supply state notification unit 610, and a power management unit 612.

The power supply state notification unit 610, upon receiving a notification from the power supply control unit 611, notifies a power supply state via the interface unit 601. Further, the power supply state notification unit 610 may notify regularly the power supply state. Specifically, the power supply state notifications include types of power supply states: namely, on-standby state, shift to power-saving, power-saving cancellation, power-on, and power-off. The notification of on-standby indicates that the multifunction peripheral is operating in the standby mode.

Notification of shift to power-saving is made when the multifunction peripheral shifts from the standby mode to the power-saving mode. Notification of power-saving cancellation is made when the multifunction peripheral shifts from the power-saving mode to the standby mode. Notification of power-on is made when the multifunction peripheral is powered up from the power-off state, and shifts to the standby mode. Notification of power-off is made when the multifunction peripheral shifts to the power-off. A unique communication protocol, or publicly defined communication protocol may be used as a method for notification via the interface unit 601. Further, even in the analysis server 102 designated in advance, notification may be made to a plurality of partners via a multicast or broad cast.

The power management unit 612 acquires and manages power information from the power meter 317. The power management unit 612, upon receiving notification from the power supply control unit 611, acquires power information from the power meter 317, and notifies the log management unit 613 of the power information. Further, when a given length of time has elapsed while there has been no notification from the power supply control unit 611, the power management unit 612 acquires power information, and notifies the log management unit 613 of the power information.

Furthermore, when notification is received from the power supply control unit 611, if a state prior to change of power supply state is the power-off or the power-saving mode, and the power meter is not operating, and therefore power information cannot be acquired, the power management unit 612 also notifies to the log management unit 613. Further, in response to a request from the analysis server 102, the power management unit 612 transmits integral power information at the time of the request.

The log management unit 613 receives notification from the power management unit 612, and generates and stores the power log. The power log management unit 613 transmits the power log, in response to a request from the analysis server 102. The details of the power log will be described below.

An image forming apparatus mounted with no power meter (excluding the power management unit 612 and the log management unit 613) may be employed. In this case, the power supply control unit 611, when changing power supply state, notifies only to the power supply state notification unit 610.

Furthermore, an image forming apparatus mounted with the power meter but including no power log management function (excluding the log management unit 613) may be employed. In this case, when notification is received from the power supply control unit 611, the power management unit 612 does not perform processing for notifying the log management unit 613 of the power information to be managed.

The configuration of the printer 103 that does not have a scanner can be regarded as a configuration which excludes the scanner control unit 606 and the UI control unit 603 from the configuration of the multifunction peripheral 104 illustrated in FIG. 6.

<Device Information Table>

FIG. 7A illustrates an example of a device information table provided in the device information management unit 502 illustrated in FIG. 5.

In FIG. 7A, a device identification (ID) column 701 indicates ID information that uniquely identifies each image forming apparatus in the system. A column 702 indicates a device name set for each image forming apparatus in the corresponding row. A column 703 indicates a model of each image forming apparatuses in the corresponding row.

A column 704 indicates whether collection of a power log from each image forming apparatus in the corresponding row is possible. In a case where each image forming apparatus in the corresponding row is mounted with a power meter, and includes both the power management unit 612 and the log management unit 613, collection of the power log is possible.

A column 705 indicates whether acquisition of integral power information from each image forming apparatus in the corresponding row is possible. In a case where each image forming apparatus in the corresponding row is mounted with a power meter, and includes the power management unit 612, acquisition of the integral power information is possible.

A column 706 indicates option device information of each image forming apparatus in the corresponding row, and indicates option device information additionally provided to each image forming apparatus. The option device refers to a finisher device, for example, having a function such as stapling or punching.

A column 707 indicates power supply information of an option device provided in each image forming apparatus in the corresponding row. As a power supply for the option device, there is an option device for which a power source is the image forming apparatus main body. In this case, the option device operates being supplied with electric power from the main body. Alternatively, an option device for which a power source is separated from the image forming apparatus main body, operates being supplied with electric power from a separate power source.

Each setting value of the device information table can be also set to determine an initial value depending on a model of each image forming apparatus. Model information of each image forming apparatus can be also acquired from an image forming apparatus via the network, using a protocol such as a simple network management protocol (SNMP), by the device information management unit 502. Further, the setting value can be also designated/changed by an input device of the analysis server 102.

<Main Body Power Information Table>

FIG. 7B illustrates an example of a main body power information table provided in the device information management unit 502 illustrated in FIG. 5. The power consumption for each state of each image forming apparatus can be found according to the information managed by the device information management unit 502.

In FIG. 7B, a column 708 indicates device ID. A column 709 indicates power consumption in the standby mode of each image forming apparatus in the corresponding row. A column 710 indicates power consumption while job processing is in progress in each image forming apparatus in the corresponding row. A column 711 indicates power consumption in the power-saving mode in each image forming apparatus in the corresponding row. A column 712 indicates power consumption in the power-off in each image forming apparatus in the corresponding row.

Each setting value of the main body power information table can be also set to determine an initial value depending on a model of each image forming apparatus. Further, the setting value can be also designated/changed by an input device of the analysis server 102.

<Option Power Information Table>

FIG. 7C illustrates an example of the option power information table provided in the device information management unit 502 illustrated in FIG. 5. Electric power consumed by an option device of an image forming apparatus can be found, according to the information managed by the device information management unit 502.

In FIG. 7C, a column 713 indicates device ID. A column 714 indicates power consumption in the standby mode of an option device of each image forming apparatus in the corresponding row. A column 715 indicates power consumption while job processing is in progress in an option device of each image forming apparatus in the corresponding row. A column 716 indicates power consumption in the power-saving mode in an option device of each image forming apparatus in the corresponding row. A column 717 indicates power consumption in the power-off in an option device of each image forming apparatus in the corresponding row.

Each setting value of the option power information table can be set to determine an initial value depending on type of an option device. Further, a setting value can be also designated/changed by the input device of the analysis server 102.

<Power Log Table>

FIG. 8 illustrates an example of a power log table provided in the log collection unit 503 illustrated in FIG. 5. The power log table is used to store a power log collected from each image forming apparatus that is mounted with a power meter, and includes the power management unit 612 and the log management unit 613. The information managed by the log collection unit 503 indicates a power supply state to which each image forming apparatus has shifted, and how much power each image forming apparatus has consumed.

In FIG. 8, a column 801 indicates device ID of each image forming apparatus that collects a power log. A column 802 indicates date and time at the time of the transition of the power supply state of each image forming apparatus in the corresponding row. A column 803 indicates the power supply state before the transition of each image forming apparatus in the corresponding row, on the date and time in the corresponding row. A column 804 indicates the power supply state after the transition of each image forming apparatus in the corresponding row, on the date and time in the corresponding row. A column 805 indicates power consumption amount after the previous transition of the power supply state of each image forming apparatus in the corresponding row.

In the log management unit 613 illustrated in FIG. 6, a power log is provided with information amount equivalent to a format excluding the device ID 801 from the power log table in FIG. 8. The log management unit 613 receives notification from the power management unit 612, and generates and stores the power log. In a case where power information is not contained in notification from the power management unit 612, because a state before change of the power supply state is the power-off or the power-saving mode, and the power meter was not operating, then the log management unit 613 generates and stores a power log excluding the power consumption 805.

<Integral Power Log Table>

FIG. 9 illustrates an example of an integral power log table provided in the integral power acquisition unit 504 illustrated in FIG. 5. The integral power log table is used to store an integral power log acquired from each image forming apparatus that includes the power management unit 612. The information indicates when and how much power each image forming apparatus has consumed.

In FIG. 9, a column 901 indicates device ID of each image forming apparatus that acquired an integral power log. A column 902 indicates date and time when an integral power was acquired from each image forming apparatus in the corresponding row. A column 903 indicates an integral power acquired on date and time in the corresponding row, from each image forming apparatus in the corresponding row.

<State Transition Log Table>

FIG. 10 illustrates an example of a state transition log table provided in the state monitoring unit 505 illustrated in FIG. 5. The state transition log table records a log with respect to state transition generated based on the power supply state notification. The information indicates when and to what power supply state each image forming apparatus shifted.

In FIG. 10, a column 1001 indicates device ID of each image forming apparatus in which state the transition has occurred. A column 1002 indicates date and time when the state of each image forming apparatus in the corresponding row shifted. A column 1003 indicates a power supply state to which each image forming apparatus in the corresponding row shifted on date and time in the corresponding row.

<Power Consumption Analysis Processing>

Figure 11:
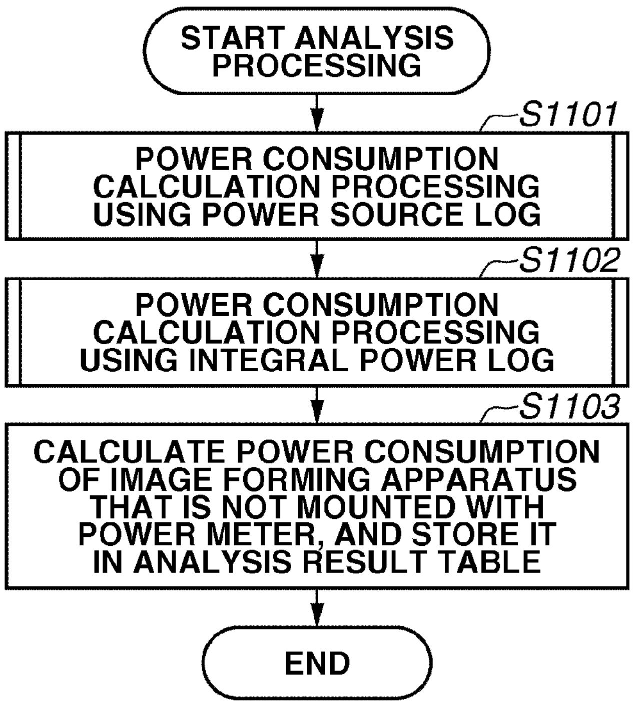
FIG. 11 is a flowchart illustrating an example of procedure for power consumption analysis processing.

FIG. 11 is a flowchart illustrating an example of first data processing procedure in the information processing apparatus. In the present example, the analysis server 102 illustrated in FIG. 1 performs processing as the information processing apparatus. Further, the analysis server 102 executes the power consumption analysis at a certain interval. S1101 to S1103 indicate each step, and each step is realized by causing the CPU 201 to load a control program onto the RAM 203 from the HD 212, or the ROM 202 and execute the control program.

When analysis processing of power consumption is started, in step S1101, the analysis processing unit 506 performs processing for obtaining power consumption using a power log. The details of calculation processing of power consumption using a power log as a specific example will be described below with reference to FIG. 12. In step S1102, the analysis processing unit 506 performs processing for obtaining power consumption using an integral power log. The details of calculation processing of power consumption using an integral power log as a specific example will be described below with reference to FIG. 13.

In step S1103, the analysis processing unit 506 obtains power consumption of an image forming apparatus that is not mounted with a power meter, stores the power consumption in an analysis result table, and terminates the processing. In this process, the way for obtaining the power consumption of the image forming apparatus that is not mounted with the power meter includes a method for calculating and obtaining power consumption amount, for example, by multiplying a time spent in each state that follows time information of the log illustrated in FIG. 10, by power consumption per unit time in each state illustrated in FIG. 7. However, the way for obtaining power consumption of the image forming apparatus that is not mounted with the power meter, is not limited to any types.

<Power Consumption Calculation Processing Using Power Log>

Figure 12:
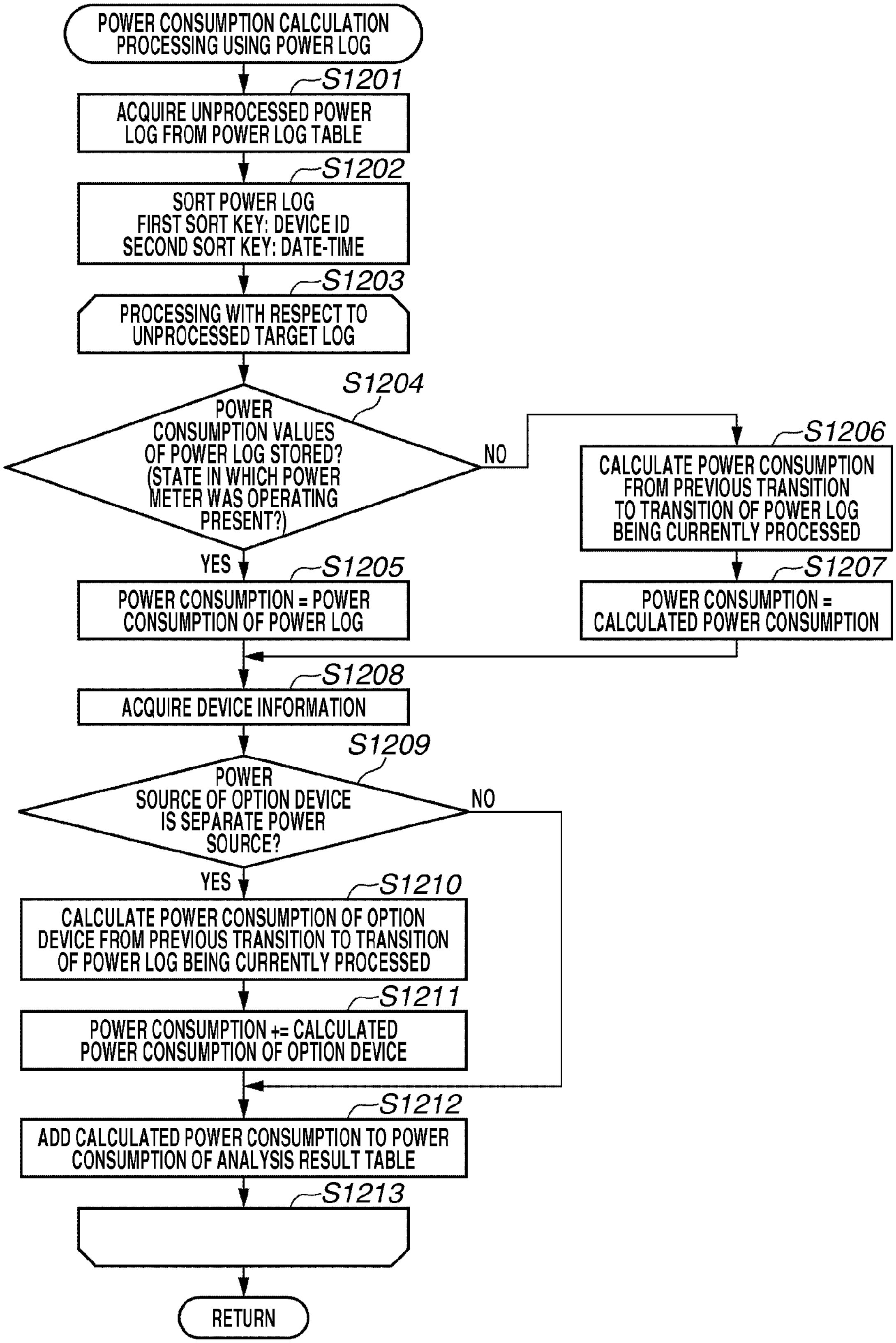
FIG. 12 is a flowchart illustrating an example of procedure for power consumption calculation processing with a power log.

FIG. 12 is a flowchart illustrating an example of second data processing procedure in the information processing apparatus. The example indicates the details of processing executed in step S1101 illustrated in FIG. 11.

In the calculation processing of power consumption using the power log, the analysis processing unit 506 calculates power consumption of the image forming apparatus mounted with the power meter, and including both the power management unit 612 and the log management unit 613, by using a power log stored in the log collection unit 503. Further, in a case where there is a state in which the power meter is not operating (e.g., sleep, power-off), the analysis processing unit 506 calculates power consumption of the state and corrects the power consumption of the image forming apparatus. Furthermore, in a case where an option device has a power source separate from an image forming apparatus, and power consumption of the option device is not contained in values measured by the power meter of the image forming apparatus main body, the analysis processing unit 506 calculates a power consumption amount of the option device and corrects the power consumption of the image forming apparatus.

First, in step S1201, the analysis processing unit 506 acquires an unprocessed power log which is not yet subjected to the analysis, from a power log stored in the log collection unit 503. Subsequently, in step S1202, the analysis processing unit 506 sorts the power log acquired in step S1201, with a device ID 801 as a first sort key, and with a date and time 802 as a second sort key.

Then, the analysis processing unit 506 repeatedly executes the processing in steps S1203 to S1213, with respect to the unprocessed power log described above.

In step S1204, the analysis processing unit 506 determines whether values are stored in the power consumption 805 of the power log being currently processed, i.e., whether it was a state in which the power meter was operating. If the analysis processing unit 506 determines that values are stored in the power consumption 805 of the power log being currently processed and it was a state in which the power meter was operating (YES in step S1204), the process proceeds to step S1205. In step S1205, the analysis processing unit 506 stores the power consumption column 805 of the power log as the power consumption.

On the other hand, in step S1204, if the analysis processing unit 506 determines that values are not stored in the power consumption column 805 of the power log currently being processed, i.e., it was a state in which the power meter was not operating (NO in step S1204), the process proceeds to step S1206. In step S1206, the analysis processing unit 506 calculates power consumption from the transition previous to the power log currently being processed, to a transition of the power log currently being processed. For example, if a state prior to transition of the power log currently being processed is the power-saving mode, the analysis processing unit 506 calculates power consumption by multiplying a power-saving mode power consumption 711 of the image forming apparatus per unit time, by a time from the preceding date and time of the power log, to date and time of the power log currently being processed. The power consumption calculated by the processing becomes power consumption in a state where the power meter is not operating. Subsequently, in step S1207, the analysis processing unit 506 stores the power consumption calculated in step S1206 as the power consumption.

In step S1208, the analysis processing unit 506 acquires the device information of the image forming apparatus corresponding to the device ID 801 of the power log currently being processed, from the device information stored in the device information management unit 502. In step S1209, the analysis processing unit 506 determines whether the option device power source 707 in the device information acquired in step S1208 is a separate power source. If the power source of the option device is the main body, power consumption of the option device is included in values measured by the power meter. If the analysis processing unit 506 determines that the option device power source 707 in the device information is a separate power source (YES in step S1209), the process proceeds to step S1210. If it is not a separate power source (NO step S1209), the process proceeds to step S1212.

In step S1210, the analysis processing unit 506 calculates power consumption of the option device from the transition preceding the power log currently being processed, to the transition of the power log currently being processed. For example, in a case where a state prior to the transition of the power log currently being processed is the standby mode, the analysis processing unit 506 calculates power consumption of the option device, by multiplying a standby mode power consumption 714 of the option device per unit time, by a time from the preceding date and time of the power log, to date and time of the power log currently being processed. Next, in step S1211, the analysis processing unit 506 adds the power consumption of the option device calculated in step S1210 to the power consumption calculated in step S1205 or in step S1207.

In step S1212, the analysis processing unit 506 adds the calculated power consumption to an analysis result of the image forming apparatus corresponding to the device ID 801 of the power log currently being processed in the analysis result table.

In step S1213, the analysis processing unit 506 determines whether there is a power log in which the processing in steps S1203 to S1212 have not been performed. In this case, if the analysis processing unit 506 determines that there is a power log in which the processing in steps S1203 to S1212 have not been performed, the process returns to step S1203 and repeats the processing. On the other hand, if the analysis processing unit 506 determines that there is no power log in which the processing in steps S1203 to S1212 have not been performed, the process returns to the processing described in FIG. 11.

The processing enables calculation of power consumption of an image forming apparatus mounted with the power meter, and including both the power management unit 612 and the log management unit 613. Further, if there is a state in which the power meter is not operating, the analysis processing unit 506 can obtain power consumption in that state and correct the power consumption of the image forming apparatus. Furthermore, if the option device is a power source separated from the image forming apparatus, and power consumption of the option device is not included in values measured by the power meter of the image forming apparatus main body, the analysis processing unit 506 can obtain power consumption amount of the option device and correct the power consumption of the image forming apparatus.

<Power Consumption Calculation Processing Using Integral Power Log>

Figure 13:
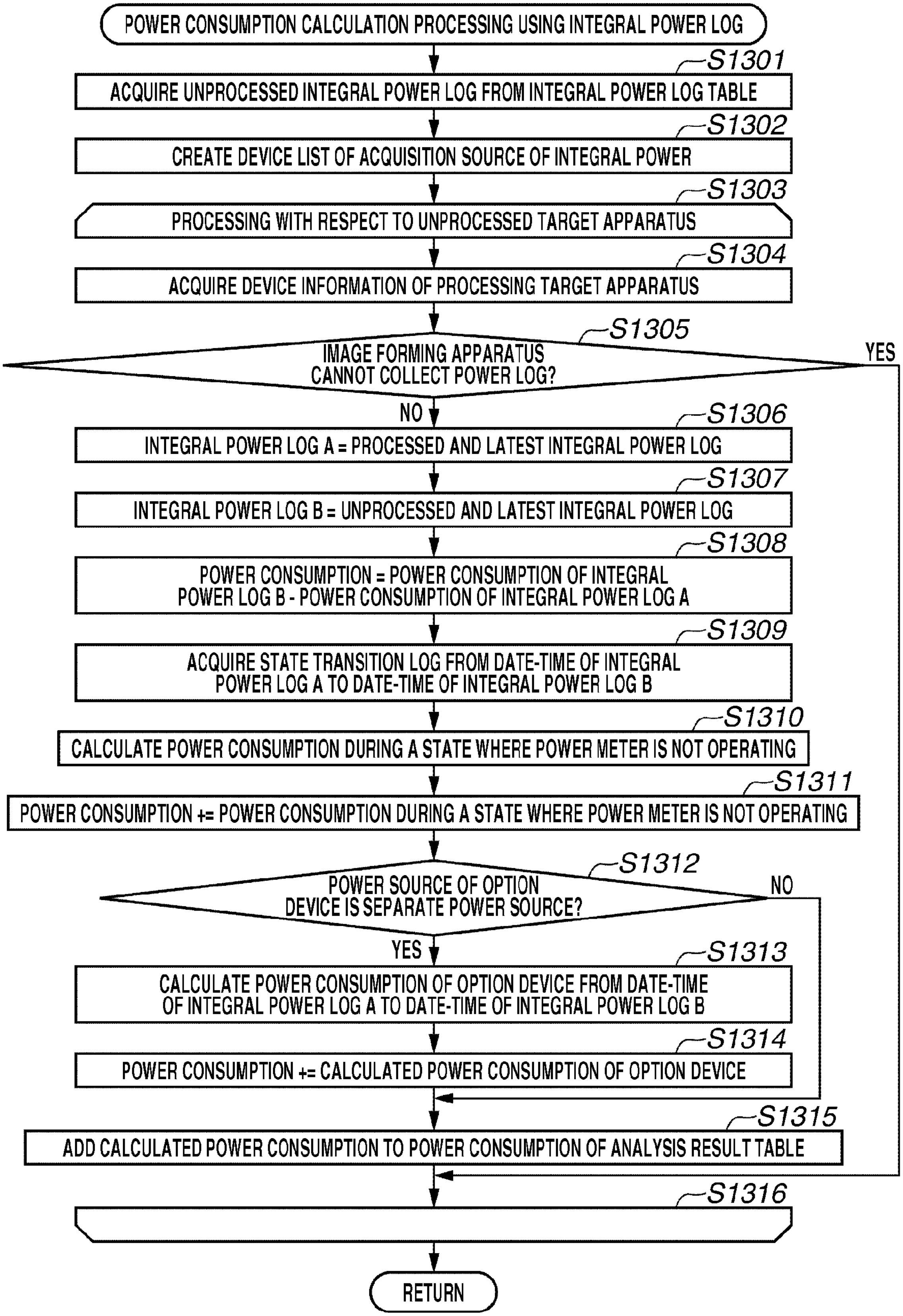
FIG. 13 is a flowchart illustrating an example of procedure for power consumption calculation processing with an integral power log.

FIG. 13 is a flowchart illustrating an example of a third data processing procedure in an information processing apparatus. The example indicates the details of processing to be executed in step S1102 illustrated in FIG. 11.

In the calculation processing of power consumption using the integral power log, power consumption of the image forming apparatus mounted with a power meter, but including no log management unit 613, is calculated using the integral power log stored in the integral power acquisition unit 504. Further, in a case where there is a state in which the power meter is not operating, the power consumption of the image forming apparatus can be corrected by obtaining power consumption in that state. Furthermore, in a case where a power supply of the option device is a power source separate from the image forming apparatus, and power consumption of the option device is not included in values measured by the power meter of the image forming apparatus main body, the power consumption of the image forming apparatus can be corrected by obtaining also the power consumption of the option device.

First, in step S1301, the analysis processing unit 506 acquires an unprocessed power log which is not yet subjected to the analysis, from the integral power log stored in the integral power acquisition unit 504. Subsequently, in step S1302, the analysis processing unit 506 refers to a device ID 901 of the unprocessed integral power log acquired in step S1301, and generates a device list of an image forming apparatus from which the integral electric power is acquired.

Then, the analysis processing unit 506 repeatedly executes the processing in steps S1303 to S1316, with respect to an unprocessed image forming apparatus in the device list generated in step S1302.

In step S1304, the analysis processing unit 506 acquires device information of an image forming apparatus of processing target, from the device information stored in the device information management unit 502.

In step S1305, the analysis processing unit 506 refers to a power log collection information 704 of the image forming apparatus of processing target to determine whether from the target image forming apparatus the power log can be collected. In this case, in the calculation processing (FIG. 12) of the power consumption using the power log, it is determined whether the power consumption has not been calculated as to the target image forming apparatus. If the analysis processing unit 506 determines that an image forming apparatus cannot collect the power log (NO in step S1305), the process proceeds to step S1306. On the other hand, if the analysis processing unit 506 determines that the image forming apparatus can collect the power log (YES in step S1305), the process proceeds to step S1316.

In step S1306, the analysis processing unit 506 manages the latest integral power log out of processed integral power logs, as an integral power log "A", with respect to the processing target apparatus. Subsequently in step S1307, the analysis processing unit 506 manages the latest integral power log out of unprocessed integral power logs, as an integral power log "B", with respect to the processing target apparatus. In step S1308, the analysis processing unit 506 calculates a value obtained by subtracting power consumption of the integral power log "A" from power consumption of the integral power log "B", and stores the calculated value as newly obtained power consumption.

Subsequently in step S1309, the analysis processing unit 506 acquires a state transition log of the image forming apparatus currently being processed, from date and time of the integral power log "A" to date and time of the integral power log "B". The state transition log is stored in the state monitoring unit 505. In step S1310, the analysis processing unit 506 calculates power consumption during a state in which the power meter is not operating, using the state transition log acquired in step S1309. For example, from the state transition log acquired in step S1309, the analysis processing unit 506 calculates time spent being in the state where the power meter is not operating (e.g., the power-saving mode). Then, the analysis processing unit 506 calculates power consumption by multiplying power consumption per unit time in each state stored in power consumption information of the image forming apparatus, by a time spent during the state in which the power meter is not operating.

In step S1311, the analysis processing unit 506 adds the power consumption during the state in which the power meter is not operating, calculated in step S1310, to the power consumption calculated in step S1308.

In step S1312, the analysis processing unit 506 determine whether an option device power source 707 of the device information acquired in step S1304 is separate power source. If the analysis processing unit 506 determine that the option device power source 707 of the device information is a separate power source (YES in step S1312), the process proceeds to step S1313. On the other hand, if the analysis processing unit 506 determines that the option device power source 707 of the device information is not a separate power source (NO in step S1312), the process proceeds to step S1315.

In step S1313, the analysis processing unit 506 calculates power consumption of the option device, from date and time of the integral power log "A" of the integral power log currently being processed to date and time of the integral power log "B". Subsequently in step S1314, the analysis processing unit 506 adds the power consumption calculated in step S1313, to the power consumption calculated in step S1311.

In step S1315, the analysis processing unit 506 adds power consumption calculated so far to an analysis result of the image forming apparatus of processing target in the analysis result table.

In step S1316, the analysis processing unit 506 determines whether there is an image forming apparatus that has not performed the processing in steps S1303 to S1315. If the analysis processing unit 506 determines that there is an image forming apparatus that has not performed the processing in steps S1303 to S1315, the process returns to step S1303 and repeats the processing. On the other hand, if the analysis processing unit 506 determines that there is no image forming apparatus that has not performed the processing in steps S1303 to S1315, the process returns to the processing described in FIG. 11.

The processing enables calculation of power consumption of the image forming apparatus mounted with the power meter, but including no log management unit 613. Further, if there is a state in which the power meter is not operating, the power consumption of the image forming apparatus can be corrected by obtaining power consumption in the state. Furthermore, if a power source of the option device is a power source separate from the image forming apparatus, and the power consumption of the option device is not included in values measured by the power meter of the image forming apparatus main body, the power consumption of the image forming apparatus can be corrected by obtaining the power consumption of the option device.

<Analysis Result Table>

FIG. 14 illustrates an example of an analysis result table provided in the analysis processing unit 506 illustrated in FIG. 5. The analysis result table is used to record an analysis result of power consumption of the image forming apparatus calculated from power log information, integral power log information, state transition log information, power consumption information of the image forming apparatus, and power consumption information of the option device.

In FIG. 14, a month of counting column 1401 indicates when the analysis result in the corresponding row was counted. In the present exemplary embodiment, the analysis result is counted on a monthly basis, but may be counted on hourly or daily basis, depending on the cycle, during which the calculation is executed. A device ID column 1402 indicates an image forming apparatus to which the calculation result in the corresponding row corresponds to.

A total power consumption column 1403 indicates a total electric power consumed by each image forming apparatus in the corresponding row, during a month of counting in the corresponding row. A standby mode power consumption column 1404 indicates an electric power consumed in the standby mode by each image forming apparatus in the corresponding row, during a month of counting in the corresponding row. A power consumption during job processing column 1405 indicates an electric power consumed while job processing is in progress in each image forming apparatus in the corresponding row, during a month of counting in the corresponding row. A power-saving mode power consumption column 1406 indicates a power consumed in the power-saving mode by each image forming apparatus in the corresponding row, during a month of counting in the corresponding row. A power-off power consumption column 1407 indicates a power consumed during the power-off by each image forming apparatus in the corresponding row, during a month of counting in the corresponding row.

Updating of the analysis result table is performed on a regular basis by the analysis processing unit 505, for example, at one-month, one-hour, and one-day intervals.

<Power Consumption Analysis Result Display>

FIG. 15 illustrates an example of an analysis result display of power consumption in the present invention. The analysis results are displayed on a display module (DISPLAY) 210 in the analysis server 102.

Figure 15A:
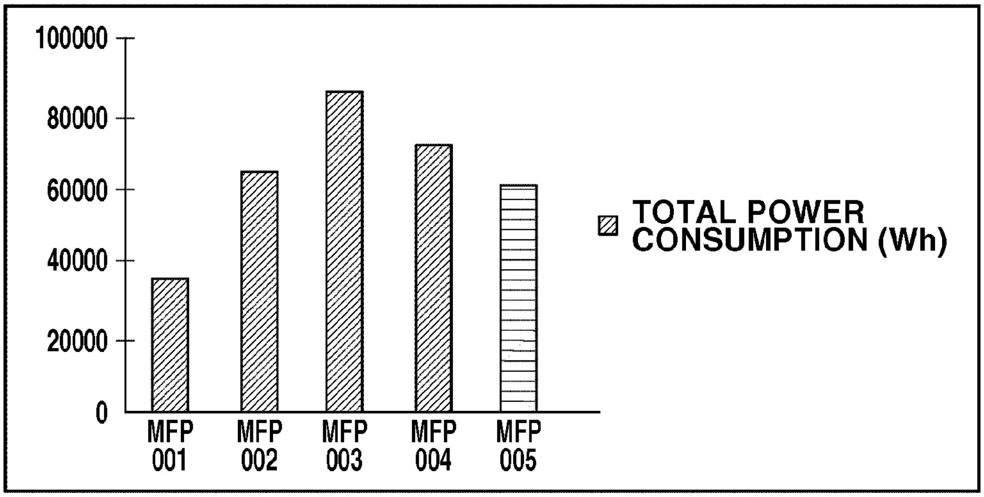
FIGS. 15A and 15B illustrate examples of power consumption analysis result displays.

FIG. 15A is an example of the total power consumption for each image forming apparatus displayed with table and graph. This is an example of representation of the total power consumption 1403 in the analysis result table with table and graph. When power consumption for each image forming apparatus is displayed, display formats are varied between the image forming apparatuses ("MFP001 to 004") that is mounted with the power meter, and the image forming apparatus ("MFP005") that is not mounted with the power meter. FIG. 15A changes a display format to be easy to recognize since the image forming apparatuses mounted with the power meter are demanded to have higher accuracies of power consumptions. Regarding display formats, the various methods are employable, for example, varying characters of the tables or colors of graphs, or gridlines of graphs, between the image forming apparatus mounted with the power meter, and the image forming apparatuses mounted with no power meter. Accordingly, difference of accuracies of the obtained power consumptions that vary depending on types of the image forming apparatuses can be visually figured out. Thus, the power consumption in the respective states of an image forming apparatus and/or the power consumption of the respective image forming apparatuses is displayed in a recognizable way.

Figure 15B:
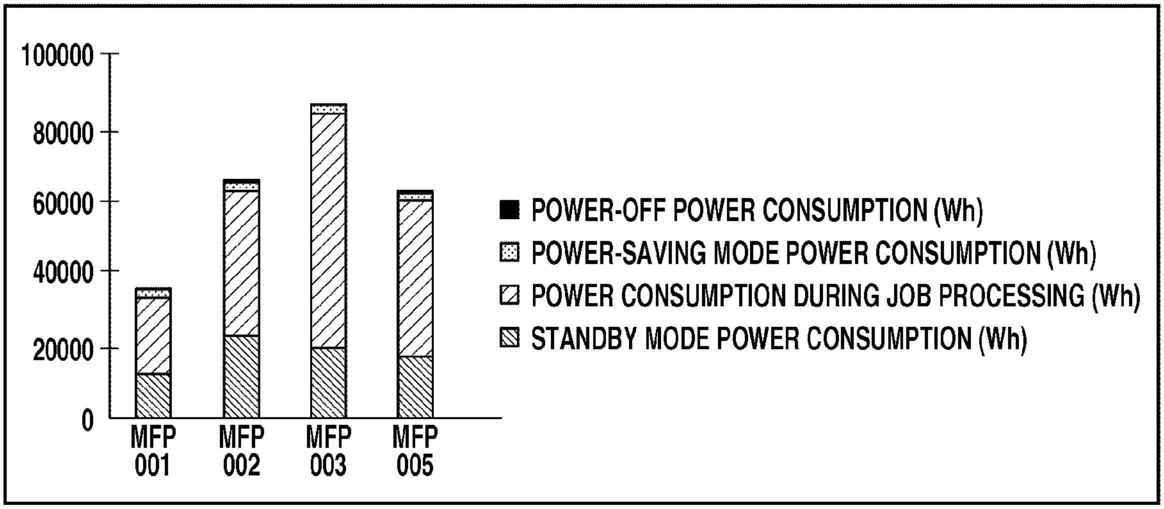

FIG. 15B is an example in which power consumptions in respective states for each image forming apparatus are displayed with table and graph. This is an example of representation in table and graph of the power consumptions 1404 to 1407 in respective states in the analysis result table. When power consumptions in respective states for each image forming apparatus are displayed, the image forming apparatuses that do not have power log management function are not subjects for the display. In the example, "MFP004" is not displayed. This is because since "MFP004" is mounted with the power meter but does not have the power log management function, "MFP004" can acquire only integral power log, and power consumption amounts in respective states in the apparatus cannot be figured out. As a result, detailed analysis cannot be performed, therefore it makes no sense to display it.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-248819 filed Nov. 14, 2011 and No. 2012-221970 filed Oct. 4, 2012, which are hereby incorporated by reference herein in their entirety.

What is claimed is:

1. A network system including a plurality of image forming apparatuses, and an analysis system that manages the plurality of image forming apparatuses, wherein the plurality of image forming apparatuses includes a first image forming apparatus that is mounted with a power meter and manages a first power log which contains information of power consumption for respective states of the first image forming apparatus, and a second image forming apparatus that is mounted with a power meter and manages a second power log which contains information of integral power consumption after use of the second image forming apparatus is started, and wherein the analysis system comprises:

a collection unit configured to collect the first and second power logs;

a first analysis unit configured to obtain power consumption of the first image forming apparatus using the first power log; and a second analysis unit configured to obtain power consumption of the second image forming apparatus using the second power log;

wherein, if the first image forming apparatus is in a predetermined state, and power consumption in the predetermined state has not been recorded, then the first analysis unit obtains power consumption of the first image forming apparatus in the predetermined state, using time spent being in the predetermined state and power consumption per unit time of the first image forming apparatus in the predetermined state, wherein, if the second image forming apparatus is in a predetermined state, and power consumption in the predetermined state has not been recorded, then the second analysis unit obtains power consumption of the second image forming apparatus in the predetermined state, using time spent being in the predetermined state and power consumption per unit time of the second image forming apparatus in the predetermined state, and wherein in a case where a power source of option devices attached to the image forming apparatuses that manage the first and second power logs is separated from a main body of the image forming apparatus, the first and second analysis units obtain the power consumptions of the image forming apparatuses that manage the first and second power logs by adding power consumptions of the option devices.

2. The network system according to claim 1, wherein the plurality of image forming apparatuses includes a third image forming apparatus that does not have a power meter, the analysis system further comprising:

a third analysis unit configured, using time spent being in respective states obtained from a state log recorded with respect to the apparatus states collected from the third image forming apparatus, and power consumption per unit time of the third image forming apparatus in respective states, to obtain power consumption of the third image forming apparatus.

3. The network system according to claim 2, further comprising a display control unit configured to control a display of power consumption which has been obtained by the first and second analysis units.

4. The network system according to claim 3, wherein the display control unit performs control such that power consumption obtained by the first and second analysis units, and power consumption obtained by the third analysis unit, are displayed in different display formats.

5. The network system according to claim 1, wherein the predetermined state is at least one of a power-saving mode and a power-off mode.

6. An analysis system that manages a first image forming apparatus that is mounted with a power meter and manages a first power log which includes information of power consumption in respective states of the first image forming apparatus, the analysis system comprising:

a collection unit configured to collect the first power log; and a first analysis unit configured to obtain power consumption of the first image forming apparatus using the first power log;

wherein if the first image forming apparatus managing the first power log is in a predetermined state, and power consumption in the predetermined state has not been recorded, then the first analysis unit obtains power consumption of the first image forming apparatus in the predetermined state, using time spent being in the predetermined state and power consumption per unit time of the first image forming apparatus in the predetermined state, and wherein the first analysis unit, in a case where a power source of an option device attached to the first image forming apparatus is separated from a main body of the first image forming apparatus, obtains the power consumption of the first image forming apparatus by adding power consumed in the option device.

7. The analysis system according to claim 6, wherein the analysis system further manages a second image forming apparatus that is mounted with a power meter and manages a second power log which includes information of an integral power after use of the second image forming apparatus is started, and wherein the analysis system further comprises:

a second analysis unit configured to obtain power consumption of the second image forming apparatus that manages the second power using the second power log collected by the collection unit, wherein if the second image forming apparatus managing the second power log is in a predetermined state, and power consumption in the predetermined state has not been recorded, then the second analysis unit obtains power consumption of the second image forming apparatus in the predetermined state, using time spent being in the predetermined state and power consumption per unit time of the second image forming apparatus in the predetermined state.

8. The analysis system according to claim 7, further comprising a display control unit, wherein the display control unit controls a display of power consumption for each state of an image forming apparatus, and in the display of the power consumption for each state, an image forming apparatus managing the second power log is not a display subject.

9. The analysis system according to claim 6 that further manages a third image forming apparatus that has no power meter, the analysis system further comprising:

a third analysis unit configured, using time spent being in respective states obtained from a state log recorded with respect to apparatus states collected from the third image forming apparatus, and power consumption per unit time of the third image forming apparatus in respective states, to obtain power consumption of the third image forming apparatus.

10. The analysis system according to claim 7, further comprising a display control unit, wherein the display control unit controls a display of power consumption obtained by the first and second analysis units.

11. The analysis system according to claim 9, further comprising a display control unit, wherein the display control unit performs control such that power consumption obtained by the first analysis unit, and power consumption obtained by the third analysis unit, are displayed in different display formats.

12. The analysis system according to claim 6, wherein the predetermined state is at least one of a power-saving mode and a power-off mode.

13. An analysis system that manages an image forming apparatus managing a second power log which includes information of an integral power after use of the image forming apparatus is started, obtained using a power meter, the analysis system comprising:

a collection unit configured to collect the second power log; and an analysis unit configured to obtain power consumption of the image forming apparatus using the second power log, wherein if an image forming apparatus managing the second power log is in a predetermined state, and power consumption in the predetermined state has not been recorded, then the analysis unit obtains power consumption of the image forming apparatus in the predetermined state, using time spent being in the predetermined state and power consumption per unit time of the image forming apparatus in the predetermined state, and wherein the analysis unit, in a case where a power source of an option device attached to the image forming apparatus managing the second power log is separated from a main body of the image forming apparatus, obtains the power consumption of the image forming apparatus by adding power consumed in the option device.

14. The analysis system according to claim 13, wherein the analysis system further comprises a display control unit configured to control a display of power consumption obtained by the analysis unit, and wherein the power consumption in respective states of the image forming apparatus or the power consumption of the image forming apparatus is displayed in a recognizable way.

15. The analysis system according to claim 13, wherein the predetermined state is at least one of a power-saving mode and a power-off mode.

16. A control method for an analysis system that manages an image forming apparatus that is mounted with a power meter and manages a first power log which includes information of power consumption for each state of the image forming apparatus, the control method comprising:

collecting the first power log; and analyzing for obtaining power consumption of the image forming apparatus using the first power log, wherein in the analyzing, if the image forming apparatus is in a predetermined state, and power consumption thereof in the predetermined state has not been recorded, then power consumption of the image forming apparatus in the predetermined state is obtained by using time spent being in the predetermined state and power consumption per unit time of the image forming apparatus in the predetermined state, and wherein in the analyzing, in a case where a power source of an option device attached to the image forming apparatus managing the first power log is separated from a main body of the image forming apparatus, the power consumption of the image forming apparatus is obtained by adding power consumed in the option device.

17. The control method according to claim 16, further comprising controlling a display of power consumption obtained by the analyzing.

18. The control method according to claim 16, wherein the predetermined state is at least one of a power-saving mode and a power-off mode.

19. A control method for an analysis system that manages an image forming apparatus that is mounted with a power meter and manages a second power log which includes information of an integral power after use of the image forming apparatus is started, the control method comprising:

collecting the second power log; and analyzing for obtaining power consumption of the image forming apparatus using the second power log, wherein in the analyzing, if the image forming apparatus is in a predetermined state, and power consumption in the predetermined state has not been recorded, then power consumption of the image forming apparatus in the predetermined state is obtained by using time spent being in the predetermined state and power consumption per unit time of the image forming apparatus in the predetermined state, and wherein in the analyzing, in a case where a power source of an option device attached to the image forming apparatus is separated from a main body of the image forming apparatus, then the power consumption of the image forming apparatus is obtained by adding power consumed in the option device.

20. The control method according to claim 19, further comprising controlling a display of power consumption obtained by the analyzing.

21. The control method according to claim 19, wherein the predetermined state is at least one of a power-saving mode and a power-off mode.

* * * * *